3,793,459
DIURETIC COMPOSITION AND METHOD
Peter Werner Feit, Gentofte, and Ole Bent Tvaermose Nielsen, Vanlose, Denmark, assignors to Lovens Kemiske Fabrik Produktionsaktieselskab, Ballerup, Denmark
No Drawing. Filed June 16, 1971, Ser. No. 153,880
Claims priority, application Great Britain, June 8, 1970, 29,792/70
Int. Cl. H61k 27/00
U.S. Cl. 424—319
10 Claims

ABSTRACT OF THE DISCLOSURE

The invention relates to diuretic and saluretic preparations in dosage unit form, containing the hitherto unknown 4-benzyl-3-n-butylamino-5-sulfamylbenzoic acid or a salt thereof with a pharmaceutically acceptable base as the active component, if desired together with a hypotensor, the dose of the diuretic being between 0.2 and 20 mg., calculated as the free acid.

The invention further relates to a method of treating patients suffering from edematous conditions and hypertension with the dosage units in question, administering from 0.2 to 50 mg. daily of the diuretic to the patient.

The present invention relates to a pharmaceutical composition for the treatment of edematous conditions and hypertension, to dosage units of the composition, and to methods for the treatment of edematous conditions and hypertension.

More particularly, the invention relates to a pharmaceutical composition containing as an active agent at least one member of the group selected from 4-benzyl-3-n-butylamino-5-sulfamylbenzoic acid and its salts with pharmaceutically acceptable inorganic and organic bases, together with auxiliary agents, and to a dosage unit of the composition for the treatment of edematous conditions and hypertension.

The substance 4-benzyl-3-n-butylamino-5-sulfamylbenzoic acid is a new compound which may be prepared, for example, by 3-amino-4-benzyl-5-sulfamylbenzoic acid being butylated at the N-atom in the 3-position, as hereinafter described.

4-benzyl-3-n-butylamino-5-sulfamylbenzoic acid possesses a favourable diuretic and saluretic activity. As far as the saluretic effect is concerned, the compound causes, in particular, an excretion of sodium and of chlorine in approximately equivalent proportions, while the excretion of the potassium ion remains substantially normal, or is only slightly increased.

It has been found that among a series of 4-substituted 3-R-amino-5-sulfamylbenzoic acids, in which R represents alkyl, aralkyl, or a hetero radical, the 4-benzyl-3-n-butyl-amino-4-phenoxy - 5 - sulfamylbenzoic acid has advantageous properties with a view to clinical use.

From a pharmaceutical point of view, it is a further advantage that 4-benzyl-3-n-butylamino-5-sulfamylbenzoic acid is chemically stable under acid conditions. Thus, for instance, no discoloration or loss in activity has been observed in pharmaceutical preparations containing the free acid, which when given orally is readily resorbed through the upper part of the gastro-intestinal tract and distributed in the body.

Specifically, it is advantageous that 4-benzyl-3-n-butyl-amino-5-sulfamylbenzoic acid has proved to be outstanding in having a diuretic effect which is comparable in type and activity to that of the well known diuretic Furosemide, belonging to the group of chlorosulfamylanthranilic acids.

The advantageous diuretic and saluretic effects of 4-benzyl-3-n-butylamino-5-sulfamylbenzoic acid, in the following Table I called OT 1441, have been demonstrated in animal experiments in which the test animals were female dogs. For intravenous injection, the compound was brought into solution with diluted sodium hydroxide, whereas oral application was in form of the free acid in capsules. Urine was taken by catheter with hourly intervals for a total of 6 hours after application. The following Table I contains the excretion of water, $Na^+$, $K^+$, and $Cl^-$ both for the first 3 hours and for the total period of 6 hours.

TABLE I
Diuretic activity of OT 1441 in dogs

| Dose, μg./kg. | Water ml./kg. | | $Na^+$ mval./kg. | | $K^+$ mval./kg. | | $Cl^-$ mval./kg. | |
|---|---|---|---|---|---|---|---|---|
| | 3h | 6h | 3h | 6h | 3h | 6h | 3h | 6h |
| Controls | 2 | 3 | 0.19 | 0.26 | 0.13 | 0.17 | 0.13 | 0.17 |
| Intravenously: | | | | | | | | |
| 10 | 9.2 | | 0.92 | | 0.26 | | 1.2 | |
| 25 | 12 | | 1.2 | | 0.41 | | 1.7 | |
| 50 | 18 | | 2.0 | | 0.37 | | 2.6 | |
| 100 | 21 | | 2.2 | | 0.56 | | 2.8 | |
| 250 | 28 | | 3.1 | | 0.65 | | 4.2 | |
| Orally: | | | | | | | | |
| 5 | 2.3 | | 0.12 | | 0.12 | | 0.26 | |
| 10 | 5.7 | 7.3 | 0.75 | 0.87 | 0.20 | 0.27 | 0.85 | 0.94 |
| 25 | 13 | 14 | 1.4 | 1.5 | 0.33 | 0.40 | 2.0 | 2.1 |
| 50 | 21 | 22 | 2.4 | 2.5 | 0.52 | 0.60 | 3.2 | 3.4 |
| 100 | 23 | 29 | 2.2 | 2.5 | 0.43 | 0.66 | 3.0 | 3.6 |
| 250 | 29 | 40 | 3.3 | 4.2 | 0.63 | 1.0 | 4.1 | 5.4 |

It is apparent from the Table I that the diuretic effect is very intensive and short-lasting. It will further be seen that in most instances the effect of a given dose was more pronounced after oral than after intravenous application. This may be explained by the renal excretion of the drug being so rapid that not enough solute is available to be excreted within the short period of rather high serum concentrations after the intravenous injection. It shows further that the compound is excellently absorbed from the gastrointestinal tract.

In the animal experiment above the effect of OT 1441 was tested against the effect of the well-known diuretic Furosemide which until now has been considered one of the most active diuretics of this type. The comparison showed that 4-benzyl-3-n-butylamino-5-sulfamylbenzoic acid was approximately 30 times as potent as Furosemide on a weight basis. The maximal effect obtainable with both compounds, however, seemed to be the same.

As far as the potassium excretion is concerned, Table I above illustrates a favorably low kaliuresis when compared to the very high excretion of water and of sodium.

In order to determine the acute toxicity of 4-benzyl-3-n-butylamino-5-sulfamylbenzoic acid, animal experiments were performed. After intravenous injection an acute $LD_{50}$ of 186 mg./kg. (172–201) was determined. This corresponds well to the value of 308 mg./kg. given for Furosemide by Muschaweck and Hajdu (Arzneimittel-Forsch. 14, 44, 1964). Thus, the higher diuretic and saluretic activities of 4 - benzyl-3-n-butylamino-5-sulfamylbenzoic acid taken into account, its toxicity must be considered extremely low.

When given orally in the above test, doses up to 1 g./kg. were given and survived by all mice.

Accordingly, it is the object of the invention to provide a pharmaceutical composition with diuretic and saluretic effect which is useful in the treatment of edematous conditions, e.g. cardiac, hepatic, renal, lung, and brain edema, of edematous conditions during pregnancy, and of other pathological conditions disturbing the balance of the electrolyte concentration in the body, for example in the form of an abnormal retension of the sodium ion, in the treatment of congestive heart failure, and in the treatment of hypertension.

With this object in view the compositions of the invention contain as an active component at least one member of the group consisting of 4-benzyl-3-n-butylamino-5-sulfamylbenzoic acid and its pharmaceutically acceptable salts with inorganic and organic bases, together with solid or liquid pharmaceutical carriers and auxiliary agents.

In the said compositions, the percentage of the diuretically active substance can vary between 0.02 and 20%.

The compositions in question can be worked up to pharmaceutical forms of presentation, such as capsules, tablets, pills, dragees, and suppositories, or they can be filled into the usual containers for injectable medicines, such a vials or ampuls or, as far as liquid mixtures for oral use are concerned, they may be filled into bottles and similar containers.

Pharmaceutical organic or inorganic, solid or liquid carriers suitable for enteral and parenteral administration can be used to make up the compositions. For example, water, gelatine, lactose, starch, magnesium stearate, stearic acid, talc, vegetable and animal oils and fats, wax, benzyl alcohol, gum, polyalkylene glycol, cetylalcohol, petroleum jelly, cocoa butter, lanolin, and other known carriers for medicaments are all suitable as carriers here, while stabilizing agents, wetting or emulsifying agents, salts for varying the osmotic pressure, and buffers for securing an adequate pH-value of the composition, can be used as auxiliary agents.

Among suitable salts of 4-benzyl-3-n-butylamino-5-sulfamylbenzoic acid for use in the present compositions mention may be made of the alkali metal salts, the alkaline-earth metal salts, the ammonium salt, and salts with organic bases, such as the ethanolamine salt and the diethanolamine salt. Besides, the free acid itself may also be used in a composition according to the invention.

Thus, for preparations in the form of tablets or the like, or in injectable preparations, the sodium salt or the potassium salt may be used, being sufficiently water-soluble. For injectable preparations, however, salts with certain organic bases may advantageously be employed due to their high solubility in water.

The free acid or its salts may also be administered in capsules, or in effervescent tablets in order to obtain a quick resorption, or in sustained-release tablets in order to obtain a prolonged effect which, in particular, is desirable in the treatment of hypertension.

In addition to 4-benzyl-3-n-butylamino-5-sulfamylbenzoic acid or a salt thereof, the compositions of the invention may contain other suitable active components in the treatment of hypertension and edematous conditions, such as hypotensors, as hydralazine, methyldopa, reserpine, and other Rauwolfia serpentina alkaloids, veratrum alkaloids and/or tranquilizers, such as meprobamate, or potassium-sparing substances, such as triamterene.

Since hypopotassemia may sometimes occur in the course of prolonged treatment of hypertensive individuals, it has been found desirable in some cases to include a small amount of an organic potassium salt in the compositions of this invention, such as potassium acetate, potassium propionate, potassium lactate, potassium ascorbate, potassium mandelate, potassium hippurate, or potassium gluconate, or a nontoxic inorganic potassium salt, such as potassium chloride. Since hypochloremia as well as hypopotassemia sometimes occurs during treatment of hypertensive individuals, potassium chloride may be used to supply chloride ions as well as potassium ions.

The term "veratrum alkaloids," when used in this specification, is intended to cover the group of chemically related organic nitrogenous bases obtained from liliaceous plants belonging to the suborder Melanthaceae.

The veratrum alkaloids are useful in pure, crystalline form or in the form of mixtures obtained from the powdered root or rhizome. The preferred veratrum alkaloids for use in the composition of the present invention are Veratrum viride, and protoveratrine A and B.

The term "rauwolfia alkaloids" comprises the group of organic nitrogenous bases which may be obtained from Rauwolfia serpentina Benth. This component of the present invention may be used in the form of the powdered whole root or in the form of the pure crystalline alkaloids, reserpine, rescinamine, and deserpidine, which are obtainable from the whole root. The above examples of additional active ingredients are not to be considered limitative for the compositions of the present invention.

Owing to the short-lasting effect of 4-benzyl-3-n-butylamino-5-sulfamylbenzoic acid, even when administered orally in the form of capsules, the compound is preferably administered in the form of sustained-release tablets. In such tablets 4-benzyl-3-n-butylamino-5-sulfamylbenzoic acid, pheferably in the form of a water-soluble salt, can be embedded in a tablet core consisting of a hydrophobic material, such as a wax with a melting point at or slightly above the body temperature. On administration, the compound will then gradually be extracted into the gastro-intestinal tract without disintegration of the tablet core whereby a controlled diuresis and a prolonged effect is obtained.

In this embodiment, if the composition of the invention in dosage unit form contains other active ingredients, these may be contained in the coating material for the core of the sustained-release tablet whereby a tablet is provided which is particularly advantageous in the control of hypertension.

Thus, the coating may contain ingredients such as reserpine and other alkaloids, methyldopa, and similar hypotensors.

On the other hand, the sustained-release tablet may advantageously contain a potassium salt in the tablet core in order to obtain a slow release of the potassium ion, thereby avoiding disturbances in the gastro-intestinal tract due to instantaneous high salt-concentrations after the intake.

Another object of the invention resides in the selection of a dose of the 4-benzyl-3-n-butylamino-5-sulfamylbenzoic acid and its salts which can be administered so that the desired activity is achieved without simultaneous secondary effect. It has been found that 4-benzyl-3-n-butylamino-5-sulfamylbenzoic acid and its salts are conveniently administered in dosage units containing not less than 0.2 mg., and up to 20 mg., preferably from 0.5–5 mg., calculated as the free acid 4-benzyl-3-n-butyl-amino-5-sulfamylbenzoic acid.

By the term "dosage unit" is meant a unitary, i.e. a single dose which is capable of being administered to a patient, and which may be readily handled and packed, remaining as a physically stable unit dose comprising either the active material as such or a mixture of it with solid or liquid pharmaceutical diluents or carriers.

If the composition is to be injected, a sealed ampoule, a vial or a similar container may be provided containing a parenterally acceptable aqueous or oily injectable solution or dispersion of the active material as the dosage unit.

It is still another object of the invention to provide a method of treating patients suffering from edematous conditions and hypertension, the method comprising administering to the patient from 0.2 to 25 mg. per day of 4-benzyl-3-n-butylamino-5-sulfamylbenzoic acid or a corresponding dose of one of its salts with pharmaceutically acceptable bases. Preferably, the compound is given in the form of the dosage unit aforesaid.

For oral administration, the dosage unit may conveniently contain from 0.2–10 mg. of the 4-benzyl-3-n-butylamino-5-sulfamylbenzoic acid, as such or in the form of one of its salts, the unit being in the form of a tablet, a pill, or a capsule, to be given at suitable intervals, for instance once, twice, or thrice daily, always depending, however, on the patient and his condition. Preferably, each tablet contains from 0.5 to 5 mg. of the 4-benzyl-3-n-butylamino-5-sulfamylbenzoic acid, or a corresponding amount of one of its salts. If the dosage unit is injectable, the unit may consist of from 0.1 to 5 mg. of the 4-benzyl-3-n-butylamino-5-sulfamylbenzoic acid, and conveniently from 0.2 to 2 mg. dissolved in an aqueous solvent, the said dosage unit for instance being enclosed in an ampul containing, for example, 2 ml. of a 0.025 percent aqueous solution of the sodium salt of 4-benzyl-3-n-butylamino-5-sulfamylbenzoic acid.

The parenteral preparations are in particular useful in the treatment of conditions in which a quick dehydration is desirable, e.g. in the intensive therapy in the case of edemas in the lung. In the continuous therapy of the patients suffering from e.g. hypertension, the tablets or capsules may be the appropriate form of pharmaceutical preparation owing to the prolonged effect obtained when the drug is given orally, in particular in the form of sustained-release tablets.

In the treatment of heart failure and hypertension such tablets may advantageously contain other active components, as specified hereinbefore.

Thus, for instance, the tablets may contain each 0.5 mg. of the 4 - benzyl-3-n-butylamino-5-sulfamylbenzoic acid or one of its salts in combination with hydralazine in amounts from 10 to 50 mg., or reserpine in amounts from 0.05 to 0.5 mg., or from 20 to 100 mg. in the form of powdered whole root, or protoveratrine in amounts ranging from 0.05 to 0.4 mg., and if in the form of a mixture of alkaloids, e.g. Veratrum viride, 50 mg. is preferred, or methyldopa in amounts from 100 to 500 mg., and furthermore the tablets may contain, as a tranquilizer, meprobamate [2:2-di(carbamoyloxymethyl)-pentane] in amounts from 100 to 400 mg., preferably 150 mg. to 250 mg.

A method of producing 4 - benzyl-3-n-butylamino-5-sulfamylbenzoic acid and salts thereof will be described in details in the following.

4-benzyl-3-n-butylamino-5-sulfamylbenzoic acid

A. Ethyl 4-benzoyl-3,5-dinitrobenzoate.—A mixture of 4-carbethoxy-2,6-dinitrobenzoic acid (85 g.), thionyl-chloride (85 ml.) and pyridine (0.25 ml.) is refluxed for about 3 hours. The resulting solution is evaporated in vacuo and the remaining 4-carbethoxy-2,6-dinitrobenzoyl chloride is dissolved in dry benzene (130 ml.). Anhydrous aluminum chloride (50 g.) is then added in portions to the refluxing solution while stirring vigorously. After the addition is completed, the mixture is stirred and refluxed for a further 2 hours. After cooling to about 50° C., methylene chloride (250 ml.) is added followed by a mixture of ice (250 g.) and concentrated hydrochloric acid (150 ml.). After additional stirring for about 1 hour, the organic layer is separated, washed with water and evaporated in vacuo. The residue is triturated with hot ethanol (200 ml.) and, after cooling, the resulting precipitate is collected by filtration, and washed with cold ethanol followed by petroleum ether. After drying and recrystallization from methylcellosolve, ethyl 4-benzoyl-3,5-dinitrobenzoate is obtained with a melting point of 172–173° C.

B. 4-benzoyl - 3,5 - dinitrobenzoic acid.—To a stirred suspension of ethyl 4-benzoyl-3,5-dinitrobenzoate (160 g.) in ethanol (800 ml.), 2 N sodium hydroxide (260 ml.) is added dropwise within 15 minutes. After additional stirring for 10 minutes, the resulting solution is clarified by filtration and is then acidified by the addition of 4 N hydrochloric acid (150 ml.). After cooling, the resulting precipitate is collected by filtration and washed with water. After drying and recrystallization from aqueous ethanol, 4-benzoyl - 3,5 - dinitrobenzoic acid is obtained with a melting point of 248–251° C. (dec.).

C. 5-amino - 4 - benzoyl - 3 - nitrobenpoic acid.—A mixture of 4-benzoyl - 3,5 - dinitrobenzoic acid (110 g.) and pyridine (220 ml.) is heated on a steam bath for about 15 minutes to afford the formation of the pyridinium-salt. Water (440 ml.) is then added and the mixture is cooled to 20–22° C. To the stirred mixture, sodium dithionite (124 g.) is then added in portions during 7–8 minutes keeping the temperature at 20–22° C. After the addition is completed the stirring is continued for a further 6–7 minutes allowing the temperature to drop to 12–15° C. The resulting red solution is carefully acidified with concentrated hydrochloric acid (380 ml.) keeping the temperature below 22° C. The reaction mixture is left at room temperature for about 20 hours. The precipitated material is then collected by filtration and washed with water. After recrystallization from acetonitrile, 5-amino - 4 - benzoyl - 3 - nitrobenzoic acid is obtained with a melting point of 203–204° C. (dec.).

D. 4-benzoyl - 3 - nitro - 5 - sulfamylbenzoic acid.—A mixture of 5-amino - 4 - benzoyl - 3 - nitrobenzoic acid (28.6 g.) and concentrated hydrochloric acid (100 ml.) is heated on a steam bath for about 10 minutes and then cooled. The amine is diazotized by dropwise addition of a solution of sodium nitrite (7.6 g.) in water (40 ml.) while stirring at 0–5° C. The resulting diazonium-mixture is poured into a solution of cupric chloride dihydrate (4.0 g.) in water (15.0 ml.) and acetic acid (140 ml.) saturated with SO$_2$, while stirring at room temperature. The stirring is continued for a further 1 hour and the mixture is then diluted with cold water (300 ml.). The precipitated 4-benzoyl-5-chlorosulfonyl - 3 - nitro-benzoic acid is collected by filtration and washed with water. The damp filter-cake is then added in portions to concentrated ammonium hydroxide (300 ml.) while stirring at 10–12° C. After additional stirring at room temperature for about 20 hours, the solution is carefully acidified to pH=2.0 with concentrated hydrochloric acid. The resulting precipitate is collected by filtration and washed with water. After drying and recrystallization from aqueous ethanol, 4-benzoyl-3-nitro-5-sulfamylbenzoic acid is obtained with a melting point of 234–235° C.

E. 4-amino - 6 - carboxy - 3 - phenyl - 1,2 - benzisothiazole-1,1-dioxide.—To a stirred solution of 4-benzoyl-3-nitro-5-sulfamylbenzoic acid (7.0 g.) in a mixture of pyridine (15 ml.) and water (50 ml.), sodium dithionite (14 g.) is added in portions. The mixture is heated on a steam bath for about 1 hour and is then evaporated in vacuo. The remaining material is dissolved in hot water (about 50 ml.) and the solution is acidified with concentrated hydrochloric acid (15 ml.). The mixture is heated on a steam bath for 15 minutes and left at room temperature for about 20 hours. The resulting precipitate is collected by filtration and washed with water. After drying and recrystallization from a mixture of acetonitrile and methylcellosolve, 4-amino-6-carboxy-3-phenyl-1,2-benzisothiazole - 1,1 - dioxide is obtained with a melting point of 287–288° C. (dec.).

F. 3-amino - 4 - benzyl - 5 - sulfamylbenzoic acid.—A mixture of 4-amino-6-carboxy - 3 - phenyl - 1,2 - benzisothiazole-1,1-dioxide (3.0 g.), 80% aqueous hydrazine hydrate (6.0 ml.), potassium hydroxide (2.0 g.), water (4.0 ml.) and diethylene glycol (25 ml.) is stirred at 130–140° C. for 3 hours. The temperature is then slowly raised to 215° C. allowing volatile material to distil off. The stirring at 215° C. is continued for a further 3 hours. After cooling and dilution with water (20 ml.), the reaction mixture is acidified with concentrated hydrochloric acid (5 ml.). The resulting precipitate is collected by filtration and washed with water. After drying, and recrystallization from ethanol 2 - amino - 4 - benzyl-5-sulfamylbenzoic acid is obtained with a melting point of 285–286° C. (dec.).

G. Sodium salt of 4-benzyl-3-n-butylamino-5-sulfamylbenzoic acid.—To a suspension of 3-amino - 4 - benzyl-5-sulfamylbenzoic acid (13.5 g.) in n-butanol (400 ml.), concentrated sulphuric acid (3.0 ml.) is added. The reaction mixture is then refluxed under such conditions that the water formed during the reaction is separated. When the NMR-spectrum of a sample of the reaction mixture diluted with n-butanol shows that more than 90% of the n-butyl 3-amino - 4 - benzyl - 5 - sulfamylbenzoate intermediate formed is converted into the corresponding 3-n-butylaminobenzoate (which causes a frequence shift to higher field of the two doublets of the aromatic protons of the ring carrying the sulfamyl-group) 2 N sodium hydroxide (100 ml.) is added and the mixture refluxed for a further 30 minutes. After this saponification, the reaction mixture is neutralized to a pH of 8 by the addition of hydrochloric acid. After cooling, the resulting precipitate is filtered off, washed with a minor amount of ice-cold water and dried. After recrystallization from water, the sodium salt of 4-benzyl-3-n-butylamino - 5 - sulfamylbenzoic acid is obtained as a dihydrate with a melting point of 285–290° C. (dec.) after loss of water of crystallization at about 110° C.

H. 4 - benzyl-3-n-butylamino - 5 - sulfamylbenzoic acid.—Sodium 4 - benzyl-3-n-butylamino - 5 - sulfamylbenzoate dihydrate (11.0 g.) is dissolved in hot water (110 ml.) and the solution is acidified with acetic acid (10 ml.). The resulting precipitate is, after cooling, collected by filtration and washed with water. After drying and recrystallization from aqueous ethanol, 4-benzyl-3-n-butylamino-5-sulfamylbenzoic acid is obtained with a melting point of 234–235° C.

The following non-limiting examples are illustrative of the compositions of the invention:

EXAMPLE 1

Tablets containing free 4-benzyl-3-n-butylamino-5-sulfamylbenzoic acid

Ingredients: G.
  4 - benzyl - 3-n - butylamino-5-sulfamylbenzoic
    acid _____ 6
  Corn starch _____ 250
  Lactose _____ 250
  Talc _____ 25

The ingredients were mixed and screened through a 20 mesh per linear inch sieve and subsequently treated with an aqueous solution of gelatin (4 percent) in sufficient amount to form a granulate. The granulate was dried and broken on a 16 mesh per linear inch sieve. After addition of talc, the granulate was compressed into tablets of 180 mg. each, using 8 mm. punches and dies, to obtain 3000 tablets, each containing 2 mg. of the free 4-benzyl-3-n-butylamino-5-sulfamylbenzoic acid.

EXAMPLE 2

Capsules containing the free 4-benzyl-3-n-butylamino-5-sulfamylbenzoic acid

Ingredients: G.
  Micronized 4 - benzyl - 3 - n - butylamino-5-
    sulfamylbenzoic acid _____ 2.25
  Lactose _____ 184
  Magnesium stearate _____ 2

The ingredients were mixed and passed through a 60 mesh per linear inch sieve and subsequently further mixed for 15 minutes. The mixture was filled into No. 3 gelatin capsules (Parke, Davis and Co.), using a semi-automatic capsule-filling machine shaken by vibrator. Each capsule contains 125 mg. of the mixture, and in all 1500 capsules, each containing 1.5 mg. of the free 4-benzyl-3-n-butylamino-5-sulfamylbenzoic acid were obtained.

EXAMPLE 3

Capsules containing 4-benzyl-3-n-butylamino-5-sulfamylbenzoic acid and methyldopa Ingredients: G.
  4 - benzyl - 3 - n - butylamino-5-sulfamylbenzoic
    acid _____ 0.8
  Lactose _____ 176
  Talc _____ 15
  D,L-methyldopa _____ 200

The ingredients were mixed and passed through a 60 mesh per linear inch sieve. The resultant mixture was subdivided and filled into capsules, each containing 0.4 mg. of the free benzyl-3-n-butylamino-5-sulfamylbenzoic acid and 100 mg. of D,L-methyldopa.

EXAMPLE 4

Ampules containing the sodium salt of 4-benzyl-3-n-butylamino-5-sulfamylbenzoic acid Ingredients:
  4 - benzyl - 3 - n-butylamino-5-sulfamylbenzoic
    acid _____ g__ 2
  Sodium hydroxide _____ g__ 0.13
  Sodium chloride _____ g__ 36
  Sterile water up to _____ ml__ 4000

The acid was suspended into water, the suspension was adjusted to pH 7.5 with aqueous sodium hydroxide and then diluted up to 4000 ml. The resulting solution was sterilized by filtration. The sterile solution was thereafter filled into ampules under aseptic conditions, yielding 2000 ampules of 2 ml. each.

EXAMPLE 5

Tablets containing 4-benzyl-3-n-butylamino-5-sulfamylbenzoic acid and reserpine

Ingredients: G.
  4 - benzyl - 3 - n-butylamino-5-sulfamylbenzoic
    acid _____ 8
  Reserpine _____ 1
  Lactose _____ 1246
  Corn starch _____ 1925

The reserpine was triturated with 100 g. of lactose, and the mixture was forced through a 30 mesh per linear inch sieve. Thereafter the other ingredients were incorporated, and the mixture was granulated with sufficient ethyl alcohol/water (60 percent). The granulate was dried and broken on a 16 mesh per linear inch sieve. After addition of 200 g. of talc and 20 g. of magnesium stearate, and mixing, the mixture was compressed into tablets, using 10 mm. punches and dies, yielding tablets of 340 mg. containing 0.8 mg. of 4-benzyl-3-n-butylamino-5-sulfamylbenzoic acid and 0.1 mg. of reserpine.

In a similar manner, tablets were prepared which contained 0.8 mg. of 4 - benzyl - 3-n-butylamino-5-sulfamylbenzoic acid, and 10 mg. of hydralazine.

EXAMPLE 6

Tablets containing 4-benzyl-3-n-butylamino-5-sulfamylbenzoic acid and potassium chloride Ingredients: G.
  Micronized 4 - benzyl - 3 - n-butylamino-5-sul-
    famylbenzoic acid _____ 10
  Potassium chloride (passed through a 30 mesh
    per linear inch sieve) _____ 2500
  Talc _____ 75
  Polyvinyl pyrrolidone _____ 50

The ingredients were thoroughly mixed and without granulation converted into tablets using 11 mm. punches and dies, yielding 5000 tablets of 526 mg., each containing 2 mg. of 4-benzyl-3-n-butylamino-5-sulfamylbenzoic acid and 500 mg. of potassium chloride.

EXAMPLE 7

Sustained-release tablets containing each 3 mg. of 4-benzyl-3-n-butylamino-5-sulfamylbenzoic acid in the form of its sodium salt 2700 g. of lactose and 45 g. of the sodium salt of 4 - benzyl - 3-n-butylamino-5-sulfamylbenzoic acid were granulated with a 10 percent gelation solution, dried and screened through a 60 mesh per linear inch sieve. The granulate was mixed with 290 g. of stearyl alcohol and 120 g. of talc, and the mixture was converted into tablets using 8 mm. punches and dies resulting in 15,000 tablets each of 210 mg. The tablets were coated in a tablet coating machine operating on the air suspension principle with a solution of 70 g. of methylcellulose in 1100 ml. of chloroform and 900 ml. of methanol. On completion of this coating process, the tablets were maintained suspended and circulating in the air stream while the temperature was raised to 75° C. and then lowered. The increased temperature may be provided by increasing the temperature of the air, by radiation, by high frequency heating, or otherwise, whereby the stearyl alcohol of the tablet core is liquified and after cooling, tablets are provided in which the active material is embedded into a matrix of stearyl alcohol from which it is liberated slowly in the gastro-intestinal tract by diffusion without disintegration of the tablet.

EXAMPLE 8

Sustained-release tablets containing 1.0 mg. of 4-benzyl-3-n-butylamino-5-sulfamylbenzoic acid as its sodium salt, and 0.1 mg. of reserpine Sustained-release tablets were prepared as described in Example 7, each containing 1.0 mg. of the sodium salt of 4-benzyl-3-n-butylamino-5-sulfamylbenzoic acid embedded in a matrix of stearyl alcohol. In a manner known per se the tablets were coated with saccharose containing reserpine. The coating was performed in a pan by successively adding an aqueous solution containing 65% saccharose, 0.6% gelatin, and 0.5% reserpine until the coating layer of each tablet contained 0.1 mg. reserpine.

What we claim is:

1. A diuretic pharmaceutical preparation comprising a member of the group consisting of 4-benzyl-3-n-butylamino-5-sulfamylbenzoic acid and salt with a pharmaceutically acceptable base together with an atoxic pharmaceutically acceptable carrier, the quantity of the said member being between 0.2 and 20 mg., calculated as the free 4-benzyl-3-n-butylamino-5-sulfamylbenzoic acid.

2. A pharmaceutical preparation in oral dosage unit form according to claim 1, wherein the active member is the 4-benzyl-3-n-butylamino-5-sulfamylbenzoic acid as an alkali metal salt.

3. A pharmaceutical peraparation in oral dosage unit form according to claim 1, wherein the active member is the free 4-benzyl-3-n-butylamino-5-sulfamylbenzoic acid.

4. An injectable pharmaceutical preparation in dosage unit form according to claim 1, in which the units contain from 0.4 to 4 mg. of 4-benzyl-3-n-butylamino-5-sulfamylbenzoic acid in the form of a salt with a pharmaceutically acceptable base, dissolved in an aqueous medium.

5. The method for producing diuretic activity in a patient, which comprises administering to the patient from 0.2 to 50 mg. per day of a member of the group consisting of 4-benzyl-3-n-butylamino-5-sulfamylbenzoic acid, and salt with a pharmaceutically acceptable base.

6. A method as claimed in claim 5, which comprises the oral administration of an alkali metal salt of 4-benzyl-3-n-butylamino-5-sulfamylbenzoic acid in the form of tablets.

7. A method as claimed in claim 5, which comprises the oral administration of the free 4-benzyl-3-n-butylamino-5-sulfamylbenzoic acid in the form of tablets.

8. A method as claimed in claim 5, which comprises the oral administration of the free 4-benzyl-3-n-butylamino-5-sulfamylbenzoic acid in the form of capsules.

9. A method as claimed in claim 5, wherein the active member is administered orally in the form of a sustained-release preparation in which the dose of 4-benzyl-3-n-butylamino-5-sulfamylbenzoic acid is ranging from 0.2 to 20 mg.

10. A method as claimed in claim 5, which comprises injection of an aqueous solution of a salt with a pharmaceutically acceptable base of 4-benzyl-3-n-butylamino-5-sulfamylbenzoic acid in doses from 0.2 to 50 mg.

References Cited

Chemical Abstracts 73:55831j (1970).

JEROME D. GOLDBERG, Primary Examiner